United States Patent
Burns et al.

(10) Patent No.: US 8,744,857 B2
(45) Date of Patent: *Jun. 3, 2014

(54) WIRELESS SERVER BASED TEXT TO SPEECH EMAIL

(71) Applicant: Nuance Communications, Inc., Burlington, MA (US)

(72) Inventors: Stephen S. Burns, Maineville, OH (US); Mickey W. Kowitz, Maineville, OH (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,404

(22) Filed: Nov. 15, 2012

(65) Prior Publication Data

US 2013/0073288 A1 Mar. 21, 2013

Related U.S. Application Data

(63) Continuation of application No. 13/332,444, filed on Dec. 21, 2011, now Pat. No. 8,315,875, which is a continuation of application No. 11/999,334, filed on Dec. 4, 2007, now Pat. No. 8,103,509.

(60) Provisional application No. 60/872,862, filed on Dec. 5, 2006.

(51) Int. Cl.
G10L 13/00 (2006.01)

(52) U.S. Cl.
USPC ...................................... 704/270.1; 704/260

(58) Field of Classification Search
USPC .............................................. 704/260, 270.1
See application file for complete search history.

(56) References Cited

U.S. PATENT DOCUMENTS

| | | | | |
|---|---|---|---|---|
| 5,884,262 A * | 3/1999 | Wise et al. | ................. | 704/270.1 |
| 7,194,411 B2 * | 3/2007 | Slotznick et al. | ............ | 704/271 |
| 7,277,855 B1 * | 10/2007 | Acker et al. | .................. | 704/260 |
| 8,103,509 B2 * | 1/2012 | Burns et al. | ................ | 704/270.1 |
| 8,165,883 B2 * | 4/2012 | Galanes et al. | ............... | 704/270 |
| 8,224,647 B2 * | 7/2012 | Niemeyer et al. | ............. | 704/260 |
| 8,229,753 B2 * | 7/2012 | Galanes et al. | ............ | 704/270.1 |
| 8,315,875 B2 * | 11/2012 | Burns et al. | ................ | 704/270.1 |
| 8,352,268 B2 * | 1/2013 | Naik et al. | ..................... | 704/258 |
| 2002/0169615 A1 * | 11/2002 | Kruger et al. | ............. | 704/270.1 |
| 2003/0083881 A1 * | 5/2003 | Liu | ............ | 704/270.1 |
| 2004/0019487 A1 * | 1/2004 | Kleindienst et al. | ....... | 704/270.1 |
| 2006/0193450 A1 * | 8/2006 | Flynt et al. | ................. | 379/88.13 |
| 2008/0039010 A1 * | 2/2008 | Vance et al. | .................. | 455/3.06 |
| 2010/0082346 A1 * | 4/2010 | Rogers et al. | ................. | 704/260 |

* cited by examiner

Primary Examiner — Abul Azad
(74) Attorney, Agent, or Firm — Chapin IP Law, LLC

(57) ABSTRACT

An email system for mobile devices, such as cellular phones and PDAs, is disclosed which allows email messages to be played back on the mobile device as voice messages on demand by way of a media player, thus eliminating the need for a unified messaging system. Email messages are received by the mobile device in a known manner. In accordance with an important aspect of the invention, the email messages are identified by the mobile device as they are received. After the message is identified, the mobile device sends the email message in text format to a server for conversion to speech or voice format. After the message is converted to speech format, the server sends the messages back to the user's mobile device and notifies the user of the email message and then plays the message back to the user through a media player upon demand.

15 Claims, 2 Drawing Sheets

WIRELESS SERVER BASED TEXT TO SPEECH EMAIL

CROSS REFERENCE TO RELATED APPLICATIONS

This application is a continuation of U.S. Ser. No. 13/332,444 entitled "WIRELESS SERVER BASED TEXT TO SPEECH EMAIL" filed on Dec. 21, 2011, which is a continuation of U.S. Ser. No. 11/999,334 entitled "WIRELESS SERVER BASED TEXT TO SPEECH EMAIL" filed on Dec. 4, 2007, which claims benefit of the priority of U.S. Ser. No. 60/872,862 filed on Dec. 5, 2006.

BACKGROUND

The present invention relates to an email system and more particularly to an email system for mobile devices, such as Personal Digital Assistants (PDAs) and cellular phones that enables email messages to played back as a voice message by way of a media player.

Many email systems have the capability to have email messages converted for playback as a voice message. An example of such a system is disclosed in US Patent Application Publication No. US 2007/0174396 A1, entitled: "Email Text-to Speech Conversion in Sender's Voice." In addition to converting email messages to voice messages, the system disclosed in the '396 publication is also able to play the message back in the voice of the sender. As illustrated and described in the '396 publication, the system disclosed therein includes a unified messaging system and a user device that includes a text-to-speech engine. Such a configuration precludes the use of the email message to voice message feature on mobile devices, such as personal digital assistants (PDAs) and cellular phones since such mobile devices do not normally have the processing capabilities for handling a text to speech engine. Moreover, as mentioned above, the system disclosed in the '396 publication requires a unified messaging system to operate. As such, the system is not available for use in applications in systems which do not include a unified messaging system.

Thus, there is a need for a relatively less complex system that allows email text messages to be converted to voice messages and played back by mobile devices, such as PDAs and cellular phones.

SUMMARY

Briefly, the present invention relates to an email system for mobile devices, such as PDAs and cellular phones, which allows email messages to be identified as they are received by a user's mobile device and then sends the email messages to a server for conversion to an audible format and subsequently sends the messages back to the user's mobile device; notifying the user of the email message and then playing the message back to the user through a media player upon demand. As such, the system in accordance with the present invention provides enhanced functionality for PDAs and cellular phones and at the same time is considerably less complicated and thus less expensive than known text to speech email playback systems.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

The disclosures of U.S. Ser. No. 13/332,444 entitled "WIRELESS SERVER BASED TEXT TO SPEECH EMAIL" filed on Dec. 21, 2011, U.S. Ser. No. 11/999,334 entitled "WIRELESS SERVER BASED TEXT TO SPEECH EMAIL" filed on Dec. 4, 2007, and U.S. Ser. No. 60/872,862 filed on Dec. 5, 2006, are hereby incorporated herein by reference in their entirety.

The present invention relates to an email system for mobile devices, such as cellular phones and PDAs, which allows email messages sent by an email client to be played back on the mobile device as voice messages on demand by way of a media player, without the need for a unified messaging system. As will be discussed in more detail below, email messages are received by the mobile device in a known manner. In accordance with an important aspect of the invention, the email messages are identified by the mobile device as they are received. After the message is identified, the mobile device sends the email message in text format to a server for conversion to speech or voice format. After the message is converted to speech format, the server sends the messages back to the user's mobile device as an audio file or alternatively stores the message at the server. In both embodiments, the server notifies the user of the email message and then plays the corresponding voice message back to the user by way of a conventional media player upon demand.

Figure 1:
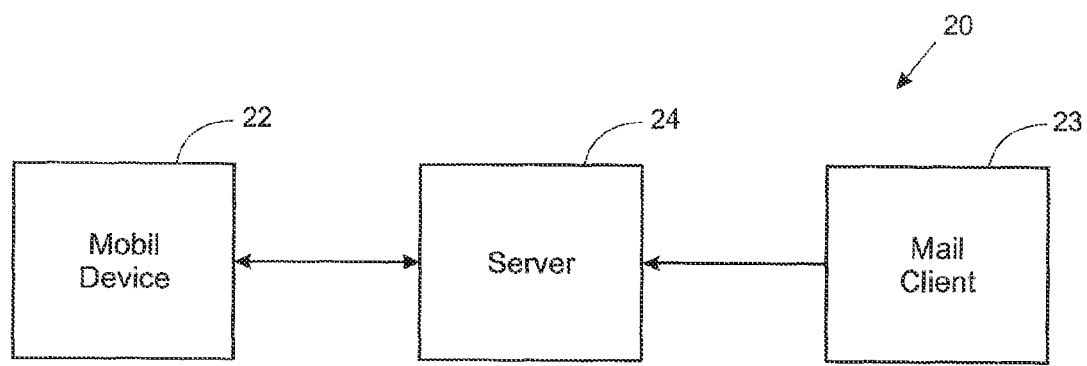
FIG. 1 is a block diagram of the system in accordance with the present invention.

As illustrated in FIG. 1, the system in accordance with the present invention, generally identified with the reference numeral 20, includes a mobile device 22 and a server 24. An email client 23 is shown as originating an email. The email client 23 does not form a part of the present invention. A client side software component resides on a mobile device 22, such as a cell phone or similar mobile wireless device. A server side software component resides on the server 24. The mobile device 22 and the server 24 include transceivers (not shown), which enable the devices to engage in bi-directional communication over a wireless communication link 25.

Client Side Software Component

The client side component can be written in languages that the client side hardware can support, such as, C++, Symbian, Java, Linux and the like. The client side component consists of an application interface that may include various user configurable features, such as the ability to enable or disable the system. This allows the user to be selective as to when the application is listening for the email messages. Additional user configurable features may include the volume of the audio playback, as well as features such as the voice for the playback, for example, male, female, with and without regional dialects, or the data to be played (e.g. From and Subject; All Fields; Subject and Body, and the like). The system may also include a language feature to enable the user to have the message converted to another language and in the voice of a male or female. The implementation of such features are well within the ordinary skill in the art. The client side configuration system may also be configured to automatically send data back to a subscription or billing application that may be included as part of the suite of modules that form the server software component to manage active subscriptions.

In addition to the configuration utility, the client side software component runs a background process in the form of a listener application or a service that waits for incoming messages. When the listener receives a notification for a message, it opens the message, such as an SMS, PIN email or standard Email and retrieves the header information to the message to obtain the Sender information, the Subject line and the Body of the Message. The listener application combines this data with a device-specific identifier, for example, the phone number of the client device. The information is then automatically sent to the server 24.

The client side software component in the mobile device 22 determines if the data has been sent correctly to the server 24. If it has, the mobile device 22 waits for a response to tell it to pickup the speech data in the device-specific format. When the server side component tells the client side software component that the speech data is available, the client side software component retrieves the data from the server 24. Alternatively, the server software component automatically sends the speech data back to the mobile device 22. In either event, the mobile device 22 may optionally append a notification tone any time a converted message is received from the server, if requested, and play the message back through, for example, the external speaker, the internal handset speaker or via a Bluetooth or wired headset coupled to the mobile device 22.

The client side software component may additionally provide visual notification of the converted email. For example, the client side application may include an on demand feature wherein the user chooses an email for playback from a menu item. Alternatively, the mobile device user may elect to have only selected emails for conversion to speech. In such an embodiment, emails are received as text messages by the mobile device in a normal manner. In this embodiment, all emails are not automatically converted to speech. Rather, the system is configured to enable a user to select individual messages for conversion to speech. For example, a "Narrate this Message" menu item may be provided and when it is selected the client side component follows the same process as described above in connection with the client side listener application and sends the message for playback.

Server Side Software Component

Figure 2:
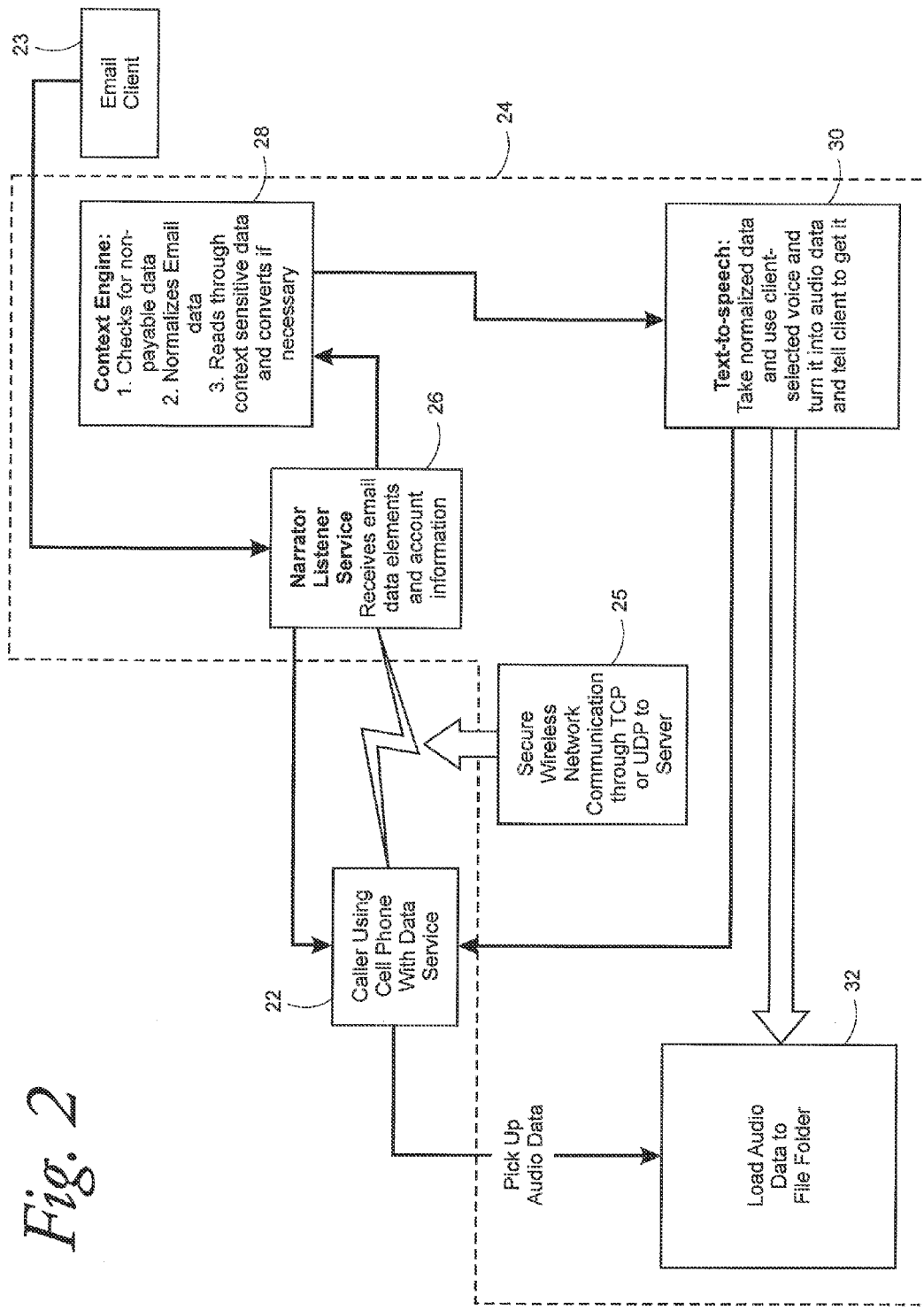
FIG. 2 is a data flow diagram of the system illustrated in FIG. 1.

The server side software component is generally shown within the dashed box 24 (FIG. 2). The server side software component includes a data listener application 26, a context engine 28, a text-to-speech engine 30 and a storage medium 32.

The data listener application 26 receives email text data from the client side application as discussed above. The data listener application 26 transfers the email text data from the mobile device 22 client side application to the context engine for filtering, as discussed below. The data listener application 26 may also be responsible for managing subscriptions and validating users and user requests, as discussed above. The context engine 28 "normalizes" the data in the email received from the mobile device 22. For example, the context engine 28 may be used to convert email addresses and forwarded text and previous reply email text into either normalized audible data or leave the data out. In addition, the context engine 28 may include various filters for filtering various types of text. For example, a filter may be provided to remove characters that can not be converted to an equivalent speech component, such as dashes, asterisks, punctuation, non-standard characters and lines for reply detail. The context engine 28 may also be configured to filter email information that is not relevant to the user, for example, abbreviations, such as, Re, forward (FWD), attachment information and the like. As well as censored content. Text filters are well known in the art, for example as generally described in US Patent Application Publication No. US 200710233861 A1, hereby incorporated by reference.

Once the context engine 28 has completed normalizing the text data included in the email from the mobile device 22, the normalized text data is passed it to the Text-to-speech ("TTS") engine 30. Such TTS engines are well known in the art. The TTS engine 30 can then be instructed to select a particular TTS voice, for example, male or female voice, or virtually any voice including the voices discussed above, to convert the text to, as selected by the user, as discussed above, and passed to the server side software component for this purpose. The server side software component can also be instructed to convert text from one language to another prior to running the data through the TTS engine. This allows for individual emails to be rendered in a language native to the user even if it comes from a user speaking a different language.

Application Example

An application example is illustrated in FIG. 2, which is an exemplary data flow diagram in accordance with the present invention. The example is not intended in any way to otherwise limit the scope of this invention. Referring to FIG. 2, an email is sent to a mobile device user. The email in text form is initially received by the server 24 in a conventional manner and is automatically forwarded to the listening application on the mobile device 22, for example, by way of a wireless communication link 34. As mentioned above, the listening application on the mobile device 22 opens the email and retrieves the header information and combines certain header information with device specific identifier for the mobile device 22, such as, the telephone number of the mobile device 22, and automatically returns this information to the server 24. The listener application 26 on the server 24 performs validation on the connection, the connection data and the user information being transferred. Once the data is validated, it is handed off to the context engine 28 for normalization. After the text data is normalized, it is directed to the TTS engine 30 where it is converted to speech data and converted to a conventional audio file format, such as a WAV, MP3 or other audio file format. Once the data is converted to an audio file, it is loaded into the file folder 32, located at the server 24 or optionally at the mobile device 22. The server 24 also notifies the mobile device 22 that the audio file is available for playback. The user can then listen to the audio file by way of a conventional media player in the mobile device 22 through the speaker, headset unit or Bluetooth device coupled to the mobile device 22.

Obviously, many modifications and variations of the present invention are possible in light of the above teachings. Thus, it is to be understood that, within the scope of the appended claims, the invention may be practiced otherwise than as specifically described above.

The invention claimed is:
1. An email system, comprising:
  a server communicably connectable to a mobile device over a wireless link, the server being operative:

to receive an email directed to the mobile device, the email having a message body and header information, the message body including text suitable for audio conversion;

to forward the email to the mobile device, wherein the mobile device executes a listening application for identifying the email, retrieves the message body and the header information from the email, retrieves a device specific identifier indicative of the mobile device, and sends the message body, the header information, and the device specific identifier to the server;

to perform a text-to-speech conversion on the text in the email to generate audio data corresponding to the message body;

to load the audio data into an audio file, the audio file having an audio file format recognizable by the mobile device; and to store the audio file in a storage medium for subsequent retrieval by the mobile device.

2. The email system of claim 1 wherein the server is further operative to transmit a notification to the mobile device indicating that the audio file is available for retrieval.

3. The email system of claim 1 wherein the server is further operative to transmit the audio file to the mobile device.

4. The email system of claim 1 wherein the server is further operative to receive a request from a client application running on the mobile device, and to convert the received information from the text format to the audio file of recorded speech.

5. The email system of claim 4 wherein the server is further operative to run a data listener application, and to receive, from the client application using the data listener application, the information in text format pertaining to the email message.

6. The email system of claim 1 wherein the server includes a context engine, and wherein the server is further operative, using the context engine, to normalize the information in text format pertaining to the email message.

7. The email system of claim 6 wherein the server is further operative, using the context engine, to remove one or more of email address text and previous reply text from the audio file.

8. The email system of claim 6 wherein the server is further operative, using the context engine, to filter the information in text format pertaining to the email message before converting the information from the text format to the audio file of recorded speech.

9. The email system of claim 6 wherein the server is further operative, using the context engine, to convert the normalized information from a first natural language to a second natural language.

10. The email system of claim 9 wherein the server is further operative to convert, using the text-to-speech engine, the normalized information in the second natural language to the audio file of recorded speech.

11. The email system of claim 1 wherein the server is further operative to convert, using the text-to-speech engine, the received information from the text format to an audio file of recorded speech in accordance with a predetermined selection of gender of voice.

12. The email system of claim 11 wherein the server is further operative to receive the predetermined selection of gender of voice from the mobile device.

13. A method of operating an email system, the email system including a mobile device communicably connectable to a server, comprising the steps of:

receiving, at the server, and email directed to the mobile device, the email having a message body and header information, the message body including text suitable for audio conversion;

forwarding, by the server, the email to the mobile device, wherein the mobile device executes a listening application for identifying the email, retrieves the message body and the header information from the email, retrieves a device specific identifier indicative of the mobile device, and sends the message body, the header information, and the device specific identifier to the server;

performing, by the server, a text-to-speech conversion of the text in the email to generate audio data corresponding to the message body;

loading, by the server, the audio data into an audio file, the audio file having an audio file format recognizable by the mobile device; and storing, by the server, the audio file in a storage medium for subsequent retrieval by the mobile device.

14. The method of claim 13 further comprising:
transmitting, by the server, a notification to the mobile device that the audio file is available for retrieval.

15. The method of claim 13 further comprising:
transmitting, by the server, the audio file to the mobile device.

* * * * *